(12) United States Patent
Schep et al.

(10) Patent No.: US 7,085,209 B2
(45) Date of Patent: Aug. 1, 2006

(54) RECORD CARRIER HAVING A SERVO TRACK WITH NON-MODULATED PARTS AT A FIRST FREQUENCY AND MODULATED PARTS AT A SECOND FREQUENCY, AND APPARATUS FOR SCANNING THE RECORD CARRIER

(75) Inventors: Cornelis Marinus Schep, Eindhoven (NL); Aalbert Stek, Eindhoven (NL); Hendrik Van Houten, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 419 days.

(21) Appl. No.: 10/257,691

(22) PCT Filed: Mar. 14, 2002

(86) PCT No.: PCT/IB02/00776

§ 371 (c)(1),
(2), (4) Date: Oct. 15, 2002

(87) PCT Pub. No.: WO02/075742

PCT Pub. Date: Sep. 26, 2002

(65) Prior Publication Data
US 2003/0128640 A1    Jul. 10, 2003

(30) Foreign Application Priority Data
Mar. 16, 2001   (EP) .................................. 01201012

(51) Int. Cl.
*G11B 7/0045*   (2006.01)
(52) U.S. Cl. ................. 369/47.31; 369/59.2; 369/275.3

(58) Field of Classification Search ............. 369/47.31, 369/59.2, 275.3; G11B 7/45, 7/0045, 7/007
See application file for complete search history.

(56) References Cited

U.S. PATENT DOCUMENTS
4,901,300 A * 2/1990 Van Der Zande et al. . 369/47.4
(Continued)

FOREIGN PATENT DOCUMENTS
EP      0326206 A1      8/1989
(Continued)

OTHER PUBLICATIONS
MAT (machine assisted translation) of JP 11-203680.*

*Primary Examiner*—Aristotelis M. Psitos
(74) *Attorney, Agent, or Firm*—Edward W. Goodman (57) ABSTRACT

A record carrier (1) has a servo track (4) indicating an information track (9) intended for recording information blocks represented by marks, the servo track (4) having a periodic variation of a physical parameter at a first frequency and modulated parts for encoding record carrier information. The modulated parts have a bit synchronization element constituted by a phase modulation of the periodic variation and a data part having data bits of the record carrier information encoded by direct digital modulation. Alternatively, the modulated parts include a second frequency, which is substantially different from the first frequency, for encoding data bits of the record carrier information, the second frequency being a integral multiple N of the first frequency. A recording and/or playback device has a device for recording/reading the information blocks and for reading the record carrier information.

9 Claims, 7 Drawing Sheets

U.S. PATENT DOCUMENTS

| | | | |
|---|---|---|---|
| 4,999,825 A * | 3/1991 | Raaymakers et al. | 369/44.26 |
| 5,237,552 A * | 8/1993 | Masood et al. | 369/47.21 |
| 5,553,043 A * | 9/1996 | Yamaguchi et al. | 369/47.22 |
| 5,642,345 A * | 6/1997 | Kurebayashi et al. | 369/124.09 |
| 6,445,656 B1 * | 9/2002 | Koide | 369/47.28 |
| 6,678,226 B1 * | 1/2004 | Horibata et al. | 369/47.3 |
| 6,690,640 B1 * | 2/2004 | Van Den Enden | 369/275.4 |

FOREIGN PATENT DOCUMENTS

| | | | |
|---|---|---|---|
| JP | 11-203680 | * | 7/1999 |
| WO | WO0043996 | | 7/2000 |

* cited by examiner

PRIOR ART

| nibble | code word | nibble | code word |
|---|---|---|---|
| 0 | 0 0 1 0 1 0 1 1 0 1 | 8 | 0 1 0 1 1 0 0 1 1 0 |
| 1 | 0 0 1 0 1 1 0 0 1 1 | 9 | 0 1 1 0 0 1 0 1 1 0 |
| 2 | 0 0 1 1 0 0 1 0 1 1 | 10 | 0 1 1 0 0 1 1 0 0 1 |
| 3 | 0 0 1 1 0 1 0 1 0 1 | 11 | 1 0 0 1 0 1 0 1 1 0 |
| 4 | 0 1 0 0 1 0 1 0 1 1 | 12 | 1 0 0 1 0 1 1 0 0 1 |
| 5 | 0 1 0 0 1 1 0 1 0 1 | 13 | 1 0 0 1 1 0 0 1 0 1 |
| 6 | 0 1 0 1 0 0 1 1 0 1 | 14 | 1 0 0 1 1 0 1 0 1 0 |
| 7 | 0 1 0 1 0 1 0 0 1 1 | 15 | 1 0 1 0 0 1 1 0 1 0 |

FIG. 7

| BitSync number | Content |
|---|---|
| 0 | bitSync followed by wordSync 0 |
| 1 | bitSync followed by wordSync 1 |
| 2 | bitSync |
| 3 | bitSync |
| 4 | bitSync followed by nibble 1 |
| 5 | bitSync |
| 6 | bitSync |
| 7 | bitSync followed by nibble 2 |
| ... | ... |
| 46 | bitSync followed by nibble 15 |
| 47 | bitSync |
| 48 | bitSync |

RECORD CARRIER HAVING A SERVO TRACK WITH NON-MODULATED PARTS AT A FIRST FREQUENCY AND MODULATED PARTS AT A SECOND FREQUENCY, AND APPARATUS FOR SCANNING THE RECORD CARRIER

BACKGROUND OF THE INVENTION

1. Field of the Invention

The invention relates to a record carrier comprising a servo track indicating an information track intended for recording information blocks represented by marks having lengths expressed in channel bits, the servo track having a periodic variation of a physical parameter, this periodic variation being modulated for encoding record carrier information.

The invention further relates to recording and/or playback device comprising means for writing and/or reading information blocks represented by marks having lengths expressed in channel bits in an information track on the record carrier, and means for scanning the servo track and retrieving the record carrier information.

The invention further relates to a method for manufacturing the record carrier.

2. Description of the Related Art

A record carrier and device of the type defined in the opening paragraph, for reading and/or writing information, are known from International Patent Application No. WO 00/43996, corresponding to U.S. Pat. No. 6,765,861 (PHN 17323). The information is encoded into an information signal which includes time codes and may be subdivided in accordance with this time codes into information blocks, the time codes being used as addresses, such as, with CD-ROM or DVD+RW. The record carrier has a servo track, usually called a pre-groove, for causing servo signals to be generated when scanning the track. A physical parameter, e.g., the radial position, of the pre-groove periodically varies constituting a so-called wobble. During the scanning of the track, this wobble leads to a variation of the servo signals. The variation is modulated by record carrier information, e.g., synchronization symbols and encoded position information, this position information indicating the absolute length of the track from the start. During recording, the position of the information blocks is synchronized as much as possible with the synchronization symbols, so that the information blocks are written on the record carrier at a position corresponding to their addresses.

A problem of the known system is that the pre-groove wobble signal cannot be demodulated reliably for recovering the encoded position information.

SUMMARY OF THE INVENTION

It is an object of the invention, for example, to provide a record carrier and device in which the record carrier information can be recorded and read easily.

According to the invention a record carrier as defined in the opening paragraph is characterized in that the modulated parts comprise a second frequency which is substantially different from the first frequency for encoding data bits of the record carrier information, the second frequency being a integral multiple N of the first frequency. According to a second aspect of the invention a record carrier as defined in the opening paragraph is characterized in that the modulated parts comprise a bit synchronization element constituted by a phase modulation of the periodic variation and a data part comprising data bits of the record carrier information encoded by direct digital modulation. Further, the recording and/or playback device as described in the opening paragraph is characterized in that the device comprises demodulation means for retrieving data bits of the record carrier information from the modulated parts.

This has the effect, that data bits can be detected independently from a type of modulation which has a substantial difference with the non-modulated periodic variation. A further advantage is, that disturbance in detection of the physical location of the periodic variations, which may be used for positioning the marks when recording, is accurate, because the substantial different modulation in a neighboring track does have a low influence on non-modulated variations when compared to modulated variations, like frequency modulation.

A further embodiment of the record carrier is characterized in that the length of one periodic variation corresponds to a third predetermined number of channel bits. The effect is that the nominal position of the $n^{th}$ channel bit corresponds exactly to the physical position of the $n^{th}$ periodic variation divided by the third predetermined number. This has the advantage that the recording location can be synchronized to the periodic variations. A relatively small third predetermined number of channel bits per periodic variation allows a high accuracy of positioning. In particular, 32 is a suitable number, because this is sufficiently longer than the longest mark used in common channel coding, which are smaller than 16 channel bits, and allows easy address calculation in a binary system.

BRIEF DESCRIPTION OF THE DRAWINGS

These and other aspects of the invention will be apparent from and elucidated further with reference to the embodiments described, by way of example, in the following description and with reference to the accompanying drawings, in which.

Corresponding elements in different Figures have identical reference numerals.

DESCRIPTION OF THE PREFERRED EMBODIMENTS

Figures 1A, 1B:
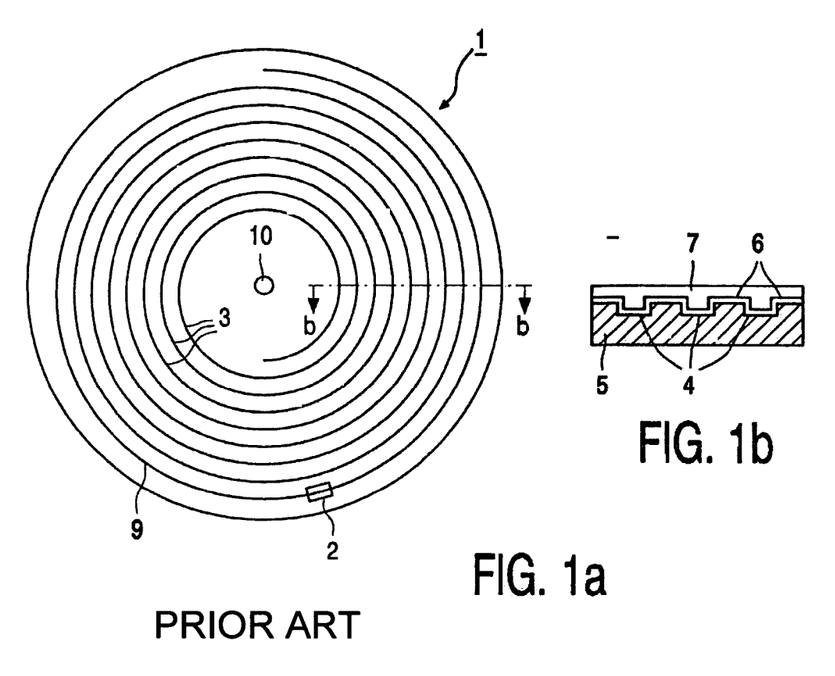
FIGS. 1a–d show a record carrier.
Figure 1C:
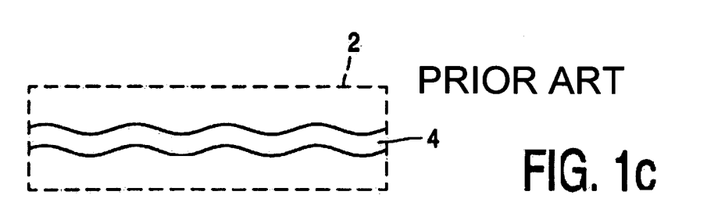
Figure 1D:
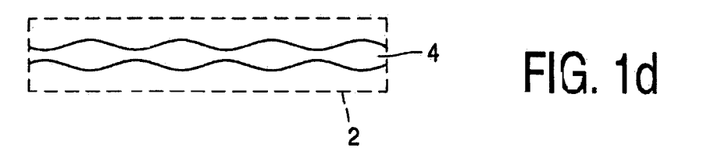

FIG. 1a shows a disc-shaped record carrier 1 comprising a continuous track 9 intended for recording, this track being arranged in a spiral pattern of windings 3. The windings may also be arranged concentrically instead of spirally. The track 9 on the record carrier is indicated by a servo track in which, for example, a pre-groove 4 enables a read/write head during scanning to follow the track 9. A servo track may also be formed, for example, by regularly spread sub-tracks which, in the servo track system, periodically cause signals to occur. FIG. 1b shows a cross-section along a line b—b of the record carrier 1, in which a transparent substrate 5 is covered by a recording layer 6 and a protective layer 7. The pre-groove 4 may also be arranged as a land or as a material property that differs from its environment. The recording layer 6 may be deposited in optical manner, magneto-optical or magnetic manner by an apparatus for reading and/or writing information, such as, the known CD recordable or hard disc for computer use. The drawing FIGS. 1c and 1d show two examples of a periodic modulation (usually called "wobble") of the pre-groove. This wobble causes an additional signal to arise in a servo track recorder. In the prior art, the wobble is, for example, frequency modulated and disc information is modulation encoded. A comprehensive description of the inscribable CD system comprising disc information obtained in such a manner can be found in U.S. Pat. No. 4,901,300 (PHN 12.398) and U.S. Pat. No. 5,187,699 (PHQ 88.002).

Figure 2:
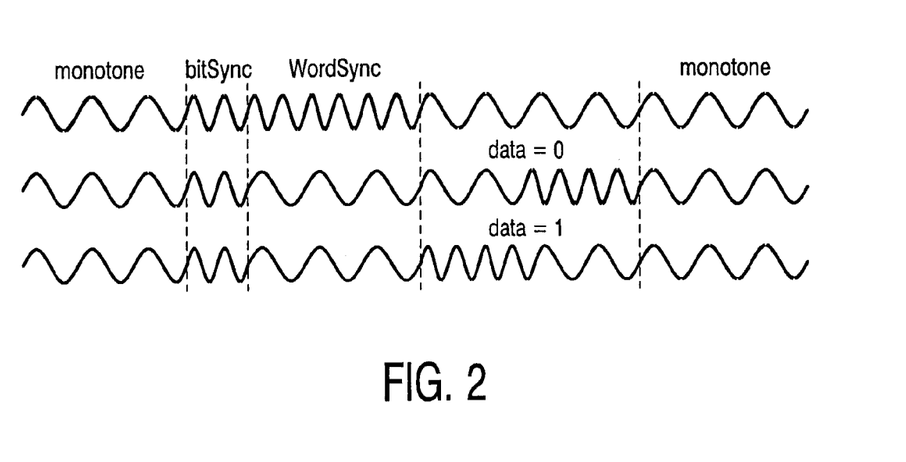
FIG. 2 shows servo track frequency modulation.

FIG. 2 shows servo track frequency modulation. The larger part of the servo track is modulated with a constant wobble frequency, so-called monotone. The monotone parts are alternated with small modulated parts, which are shown in FIG. 2. The upper trace shows the modulated part for a word sync pattern, a second and third trace show the modulated part for data bits data=0 and data=1. Each of the modulated parts starts with a bit synchronization element (bit sync) of length corresponding to one wobble period. The bit and word sync are constituted by a substantially higher frequency, i.e., in the figure, 2 times the wobble frequency. The data bits have two parts, one at the Such frequency can be easily detected because of this substantial difference.

Figure 3:
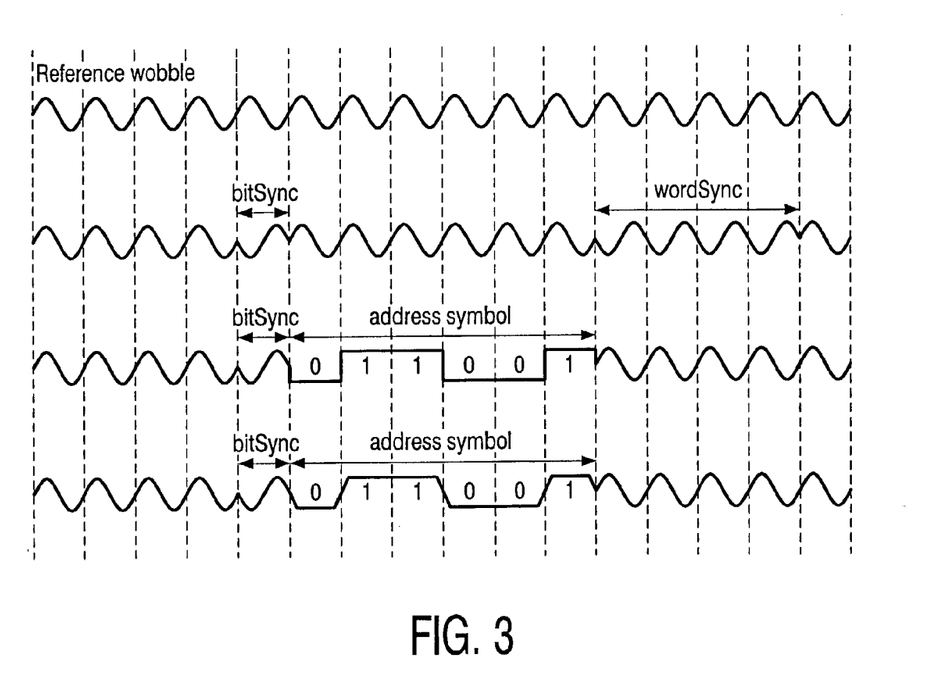
FIG. 3 shows servo track digital modulation.

FIG. 3 shows servo track digital modulation. The top trace shows a monotone wobble, which can be used as reference wobble for locking a PLL (Phase-Locked loop) in a decoder. It is shown to use inverted wobbles for the timing signals bit sync and word sync in the second trace. This is a robust way to detect from the monotone wobble. The address bits are encoded using direct digital modulation, in FIG. 3, a Run Length Limited (RLL) wobble modulation is applied, which is robust because position is known from timing signals. Such RLL modulation has a maximum length of contiguous zeroes and ones, which has the advantage that the signal can be decoded easily because signal reversals occur within a short period. Further, the modulation is different from phase-modulation; hence, it can be detected easily. There are four steps in wobble detection, step one is to lock the wobble PLL to the long monotone parts, step two is to lock to the bit-sync, which are equidistant inverted wobbles. Step 3 is to lock to the word-sync, which is a pattern of equidistant inverted wobbles, which is an inverted-wobble pattern different from the bit sync. Step 4 is to read the address data for the digitally modulated wobble. For a specific implementation, a practical choice for the relationship between the length of the encoded addresses and the data to be recorded is the following:

The bit syncs are equidistant, which is required for locking a decoder to the bit syncs. The distance is one bit sync in 71 wobbles, and each wobble is 69T, T being the channel bit period of the data to be recorded. One address word comprises a number of bit syncs, the Length of the address word is 49 bit syncs. The bit sync itself is one inverted wobble as shown in FIG. 3. The data is recorded in blocks (RUB, Recording Unit Block). A RUB is the smallest unit for recording and consists of 496 data frames and one linking frame. Then, a RUB contains 497 frames of 1932 channel bits, which results in 497*1932/69=13916 wobbles for each RUB. Further, in each RUB, 4 addresses are located, hence, 3479 (=49* 71) wobbles/address. The digital modulation of address symbols can be the RLL modulation as follows. For a digital zero ("0"), move the mastering beam (and, hence, the servo track) to the inside of the record carrier, and for a digital one ("1"), move mastering beam to the outside. Preferably, the length of a data bit of the recording information (addresses and auxiliary codes for controlling the recording process) is equal to the wobble period. The detection can be done by integration, whereas, the integration time can be easily derived from the wobble PLL. Further, the data bits are encoded in a DC-free way, i.e., with an equal number of "0"s and "1"s. No effect on servo signals is achieved as follows: k=1 (k+1 is the maximum number of consecutive "0"s or "1"s), this k constraint limiting the low frequency content and allows high-pass filtering.

In encoding the address and auxiliary data into the wobble, it is proposed to combine a number of address bits to an address bit symbol after the bit sync. A number of address bits is sown in the address symbol in FIG. 3. In the DVD+RW, only 1 address bit is encoded after each bit sync. Now, for better protection against errors while reading, the address symbols are selected to constitute a set suitable for error detection and correction (ECC). For an ECC based on 4-bit symbols, it is better to store 4 bits or 1 nibble after each bit Sync, because of lower sensitivity to short burst errors.

Figure 7:
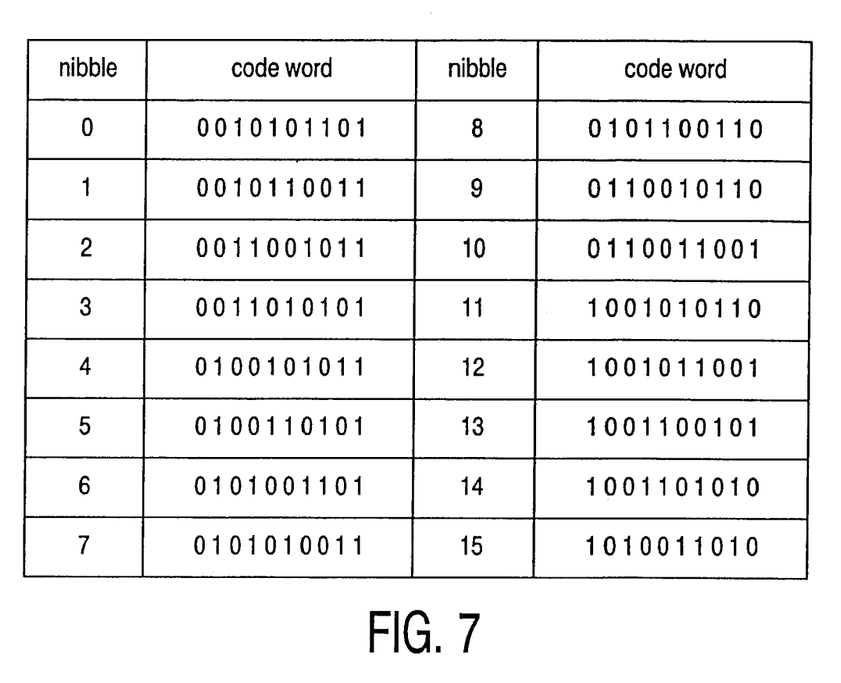
FIG. 7 shows a set of address symbols.

FIG. 7 shows suitable set of address symbols. To have at least 16 different symbols with Hamming distances equal to at least 4, we need address symbols with a length of 10 wobble periods. A Hamming distance 4 between address symbols allows good distinction between different words. The number of address symbols is selected as follows: for sufficient addressing, it is proposed to use 48 address bits, encoded in 12 address symbols, each containing 1 nibble of 4 bits. Preferably, isolated bit syncs that are not followed by an address symbol are included in the address word. The advantage is that locking to the bit sync is improved, because a lower number of false bit syncs will be detected. When detecting the bit sync next to the modulated address data bits the detector might confuse an address bit with the bit sync. An isolated bit sync cannot be confused, because only non-modulated wobbles are surrounding the isolated bit sync.

A practical selection is to have 1 out of 4 bit syncs is followed by an address symbol, and by having one bit sync followed by a word sync, the total length is 49 bit syncs (as described above).

Figure 8:
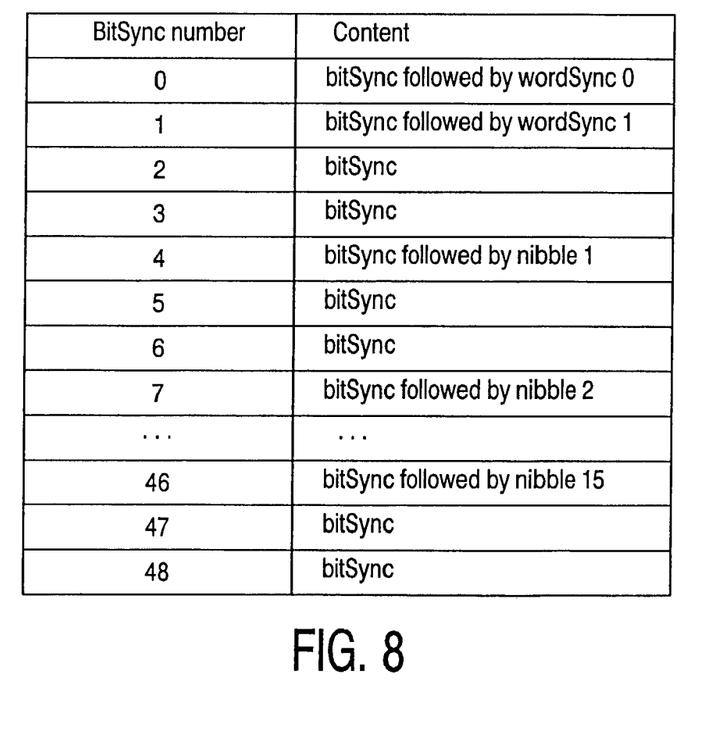
FIG. 8 shows a content of an address word.

FIG. 8 shows a content of an address word according to a different embodiment. The address word is 60 address bits, i.e., 15 address symbols, each containing 1 nibble. Now, more bits are available for data and/or ECC, and a maximum number of bits for nibble-based ECC. To keep the total address word length limited to the same length of 49 bit syncs, now 1 out of 3 bit syncs is followed by an address symbol.

Figure 4A:
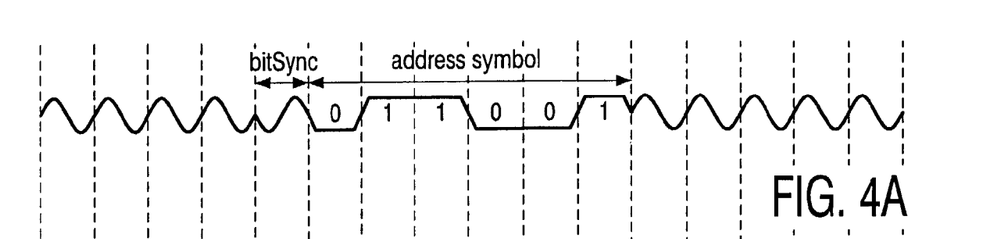
FIGS. 4A–4E show bit sync and word sync.
Figure 4B:
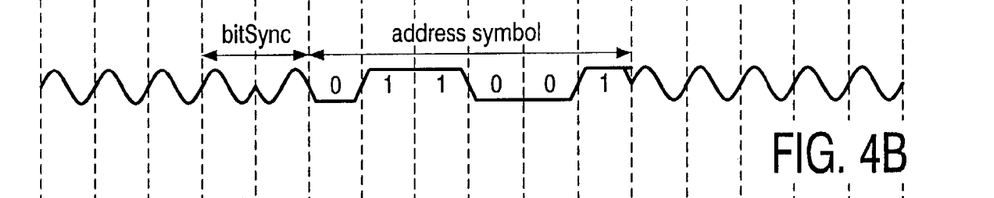
Figure 4C:
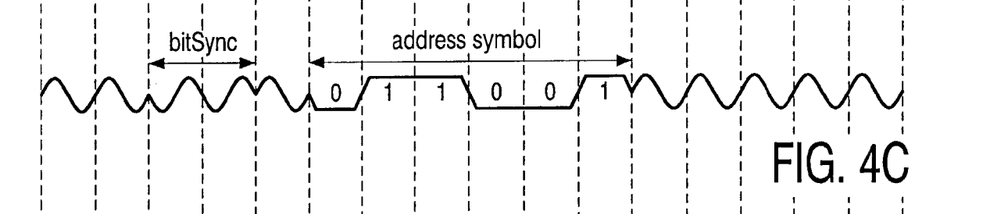
Figure 4D:
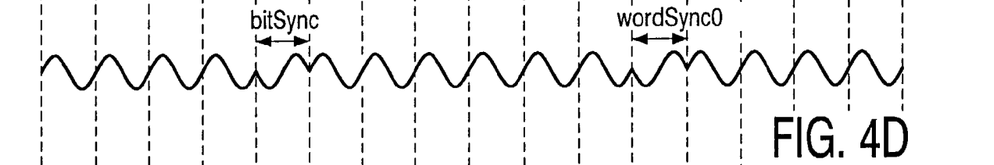
Figure 4E:
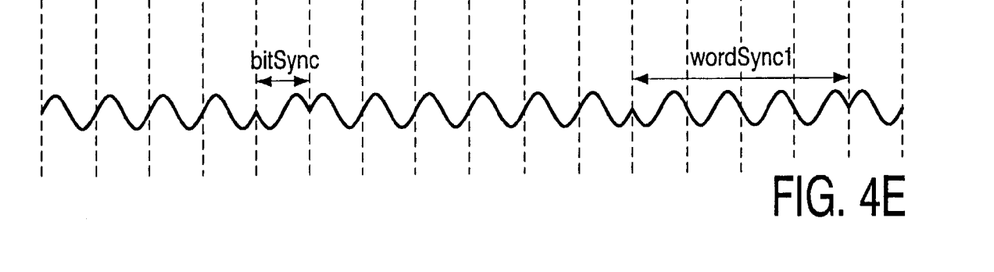

FIGS. 4A–4E show bit sync and word sync. FIG. 4A shows the bit sync of one inverted wobble. FIG. 4B shows a stronger bit sync of 2 inverted wobbles. A further option is shown in FIG. 4C, where the bit sync is not adjacent to the digitally modulated area, but further to the left. The properties of the word sync are as follows: it is based on a pattern of inverted wobbles, e.g., 4 consecutive inverted wobbles as shown in FIG. 3. Alternatively, the word sync may be based on special "address symbols", which do not occur in the address symbol set used for encoding the address bits. Such a word sync that is based on a special address symbol alone has the disadvantage that the detection of the word sync is only as strong as the detection of one of the further data nibbles, which might not be sufficient. This may be improved by using a larger Hamming distance or a violation of other constraints of the code (like the k constraint). It is proposed to include a word sync after at least one of the 49 bit syncs, but the detection may be made more reliable by including word syncs after more than one bit sync within each address word. In that case, prediction in the detector may be used to reliably detect the word syncs. Slightly different word syncs may be used to distinguish the location of the word sync within the address word. For example, FIG. 4D shows a first word sync (wordsync0) consisting of one inverted wobble, and FIG. 4E shows a second word sync (wordsync1) consisting of 4 inverted wobbles. Such different word syncs can be easily distinguished. Such word syncs, based on inverted wobbles, are preferred to special symbols in the address-symbol area, because there are more wobbles and less digital modulation. Alternatively, word syncs can also be located before the bit sync.

Figure 5:
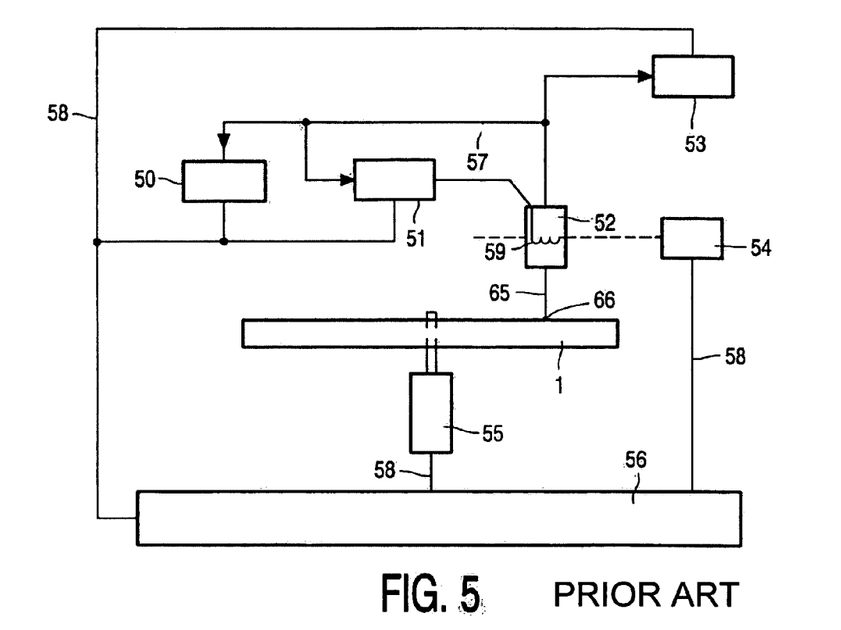
FIG. 5 shows a playback device.
Figure 6:
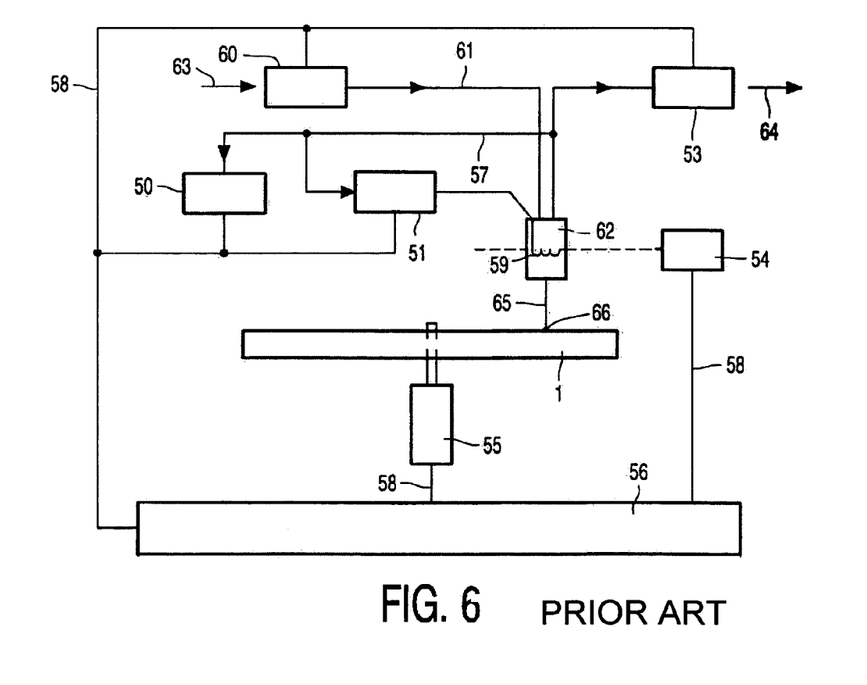
FIG. 6 shows a recording device.

FIGS. 5 and 6 show apparatuses according to the invention for scanning a record carrier 1. Writing and reading of information on optical discs and formatting, error correcting and channel coding rules, are well-known in the art, e.g., from the CD system. The apparatus of FIG. 5 is arranged for reading the record carrier 1, the record carrier being identical to the record carriers shown in FIG. 1. The device is provided with a read head 52 for scanning the track on the record carrier and read control means comprising drive unit 55 for rotating the record carrier 1, a read circuit 53, for example, comprising a channel decoder and an error corrector, tracking unit 51 and a system control unit 56. The read head comprises optical elements of the usual type for generating a radiation spot 66 focused on a track of the recording layer of the record carrier via a radiation beam 65 guided through optical elements. The radiation beam 65 is generated by a radiation source, e.g., a laser diode. The read head further comprises a focusing actuator for focusing the radiation beam 65 on the recording layer and a tracking actuator 59 for fine positioning of the spot 66 in radial direction on the center of the track. The apparatus has a positioning unit 54 for coarsely positioning the read head 52 in the radial direction on the track. The tracking actuator 59 may comprise coils for radially moving an optical element or may be arranged for changing the angle of a reflecting element on a movable part of the read head or on a part on a fixed position in the case part of the optical system is mounted on a fixed position. The radiation reflected by the recording layer is detected by a detector of a usual type, e.g., a four-quadrant diode, for generating a detector signals 57 including a read signal, a tracking error and a focusing error signal. The tracking unit 51 is coupled to the read head for receiving the tracking error signal from the read head and controlling the tracking actuator 59. During reading, the read signal is converted into output information, indicated by arrow 64, in the read circuit 53. The apparatus is provided with an address detector 50 for detecting and the retrieving address information from the detector signals 57 when scanning the servo track of the record carrier. The device is further provided with a system control unit 56 for receiving commands from a controlling computer system or from a user, and for controlling the apparatus via control lines 58, e.g., a system bus connected to the drive unit 55, the positioning unit 54, the address detector 50, the tracking unit 51 and the read circuit 53. To this end, the system control unit comprises control circuitry, for example, a microprocessor, a program memory and control gates, for performing the procedures described below. The system control unit 56 may also be implemented as a state machine in logic circuits. The read device is arranged for reading a disc having tracks having a periodic variation, e.g., a continuous wobble. The read control unit is arranged for detecting the periodic variations and for reading, in dependence thereon, a predetermined amount data from the track. In particular, the address detector 50 is arranged for reading record carrier information, e.g., position information and recording control data, from the modulated servo signals. A suitable embodiment of the address detector is a synchronous frequency detector for detecting the frequency used for modulating the recording control information according to FIG. 2. The digital RLL modulation can be detected by a digital demodulator which is switched on after the bit sync has been detected. Further other demodulators for the modulated servo signals may be used. The address detector further has a word detection unit for retrieving the words of record carrier information, as described with reference to FIGS. 3 and 4A–4E. The beginning of such a word is detected from a predetermined number of inverted wobbles as shown in the word sync, after a long sequence of non-modulated wobbles.

FIG. 6 shows a device for writing information on a record carrier according to the invention of a type which is (re)writable in, for example, a magneto-optical or optical manner (via phase change or dye) by means of a beam 65 of electromagnetic radiation. The device is also equipped for reading and comprises the same elements as the apparatus for reading described above with FIG. 5, except that it has a write/read head 62 and recording control means which comprise the same elements as the read control means, except for a write circuit 60 that comprises, for example, a formatter, an error encoder and a channel encoder. The write/read head 62 has the same function as the read head 52 together with a write function and is coupled to the write circuit 60. The information presented to the input of the write circuit 60 (indicated by the arrow 63) is distributed over logical and physical sectors according to formatting and encoding rules and converted into a write signal 61 for the write/read head 62. The system control unit 56 is arranged for controlling the write circuit 60 and for performing the position information recovery and positioning procedure as described above for the reading apparatus. During the writing operation, marks representing the information are formed on the record carrier. The recording control means is arranged for detecting the periodic variations, for example, by locking a phase-locked loop to the periodicity thereof. A predetermined, fixed number of channel bits is recorded corresponding to each instance of the periodic characteristics, e.g., 32 channel bits for a wobble. Hence, during recording of a block, the recording of the marks representing the information is synchronized exactly to the corresponding wobble. In an embodiment of the writing device, the positioning unit is arranged for positioning of blocks to be recorded based on the exact correspondence of the length of the wobble to a predetermined number of channel bits, and comprises a calculation unit arranged for calculating said position based on the relation between the address word in the wobble and the address of the information block, e.g., according to the DVD format.

In an embodiment, the reading and/or writing device comprises a phase-locked loop, for example, accommodated in the address detector, the phase-locked loop being locked to the periodic variations of the track, such as, the wobble, during scanning. After a jump of the head 52/62 to a new scanning location, the phase-locked loop may be preset to the data clock value at the new location, or the bandwidth of said phase-locked loop may be increased to lock quickly to the new wobble frequency.

It is noted that DVD+RW discs contain a wobbled groove. These wobbles have two functions: generation of an accurate and stable write clock and retrieval of address information. This gives conflicting requirements for the wobble. The first is that for optimal write-clock generation, the wobble should be as monotonic as possible, it is then easiest to lock a PLL with high accuracy. The second is that for robust retrieval of a sufficiently high rate of address information, the wobble should be modulated in one way or another (in DVD+RW, phase modulation is used but the same story holds for other modulation schemes such as frequency modulation). Modulation implies that the wobble is not purely monotonic.

Figure 9:
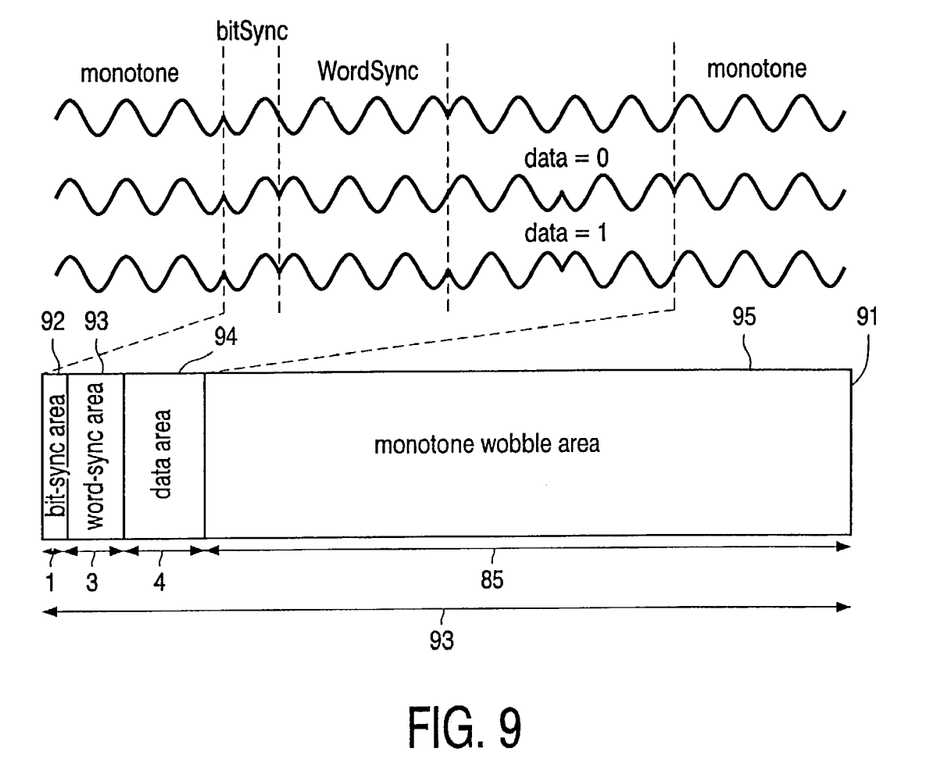
FIG. 9 shows the wobbles in DVD+RW.

FIG. 9 shows the wobbles in DVD+RW. The disc contains a structure of 93 wobbles that consist of 85 monotone wobbles and an ADIP unit of 8 wobbles. This structure is repeated 52 times to form an ADIP word. Each ADIP word starts with an ADIP unit containing a word sync that is followed by 51 ADIP units containing data, either 0 or 1. An ADIP unit with a word sync has 3 inverted wobbles in the word-sync area of length 3 and an ADIP unit with data has 2 inverted wobbles in the data area of length 4. FIG. 9 shows that each ADIP unit 91 starts with a bit-sync area 92 with a length of 1 wobble that is always inverted. This leads to the following average numbers of inverted wobble in the different areas. Bit-sync area 92: 100% inverted wobbles; Word-sync area 93: 2% inverted wobbles; Data area 94: 49% inverted wobbles; Monotone-wobble area 95: 0% inverted wobbles. The problem is that for the generation of the write clock, one can choose to use all wobbles and accept that the phase errors in the modulated parts deteriorate the clock jitter. In a preferred embodiment, only the monotone-wobble area 95 is used for write-clock generation and to ignore (blank) the modulated parts for the PLL. This has the advantage that the PLL does not see the phase error in the modulated parts, but the disadvantage that also the phase information in part of the positive wobbles is thrown away. A further option is to use both the monotone-wobble area 95 and the word-sync area 93. In this way, the number of positive wobbles is increased compared to the second option, by adding only a very small number of inverted wobbles. The problem with this last option is that the word-sync area 93 and the monotone wobble area 95 are not adjacent to each other which makes the implementation complicated.

Figure 10:
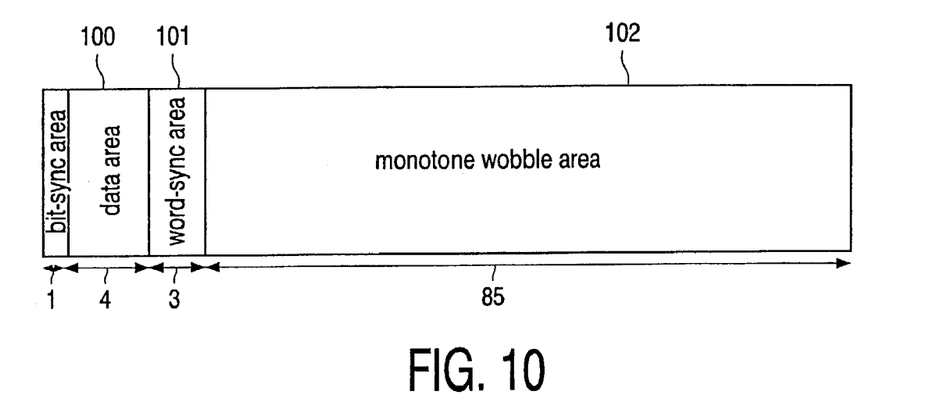
FIG. 10 shows reverse order word sync.

FIG. 10 shows reverse order word sync. The order of the word-sync area 101 and the data area 100 is reversed so that the word-sync area 101 and the monotone-wobble area 102 are adjacent thereby allowing the use of all wobble information to lock a wobble PLL for recovering the wobble frequency. This allows a simple implementation of a detector according to the last option described above for a wobble having the reverse order word sync.

Figure 11:
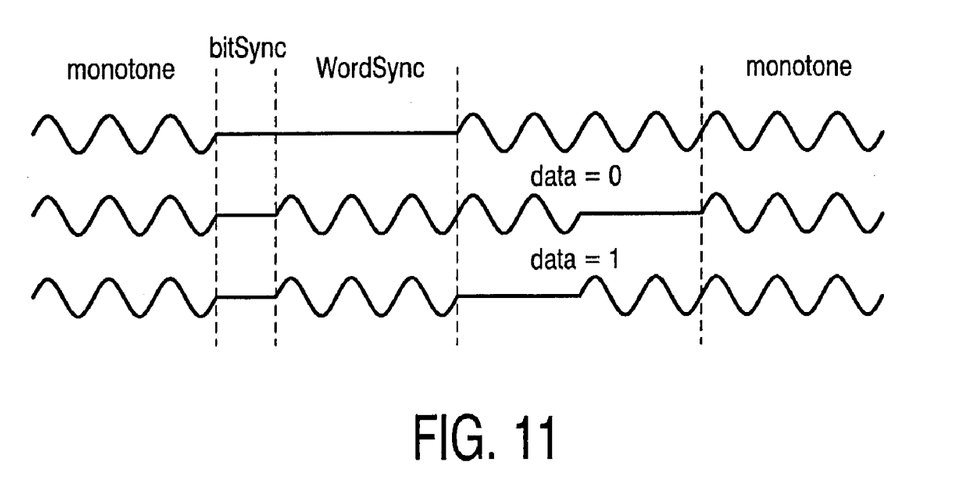
FIG. 11 shows servo track on/off modulation.

FIG. 11 shows servo track on/off modulation. The sync signals for bit sync and word sync are encoded by switching off the wobble signal, so called on/off modulation. Further the data bits are encoded by a combination of wobble periods and a switched off area. The format is suitable for the address format of a groove-only record carrier. The signal-to-noise ratio may be smaller than for phase-modulated wobbles, but this would be irrelevant if that is not the critical factor for system robustness, and detection is simpler. In an embodiment, inverted wobbles may be used in the Word Sync and/or the bit sync for timing purposes.

Figure 12:
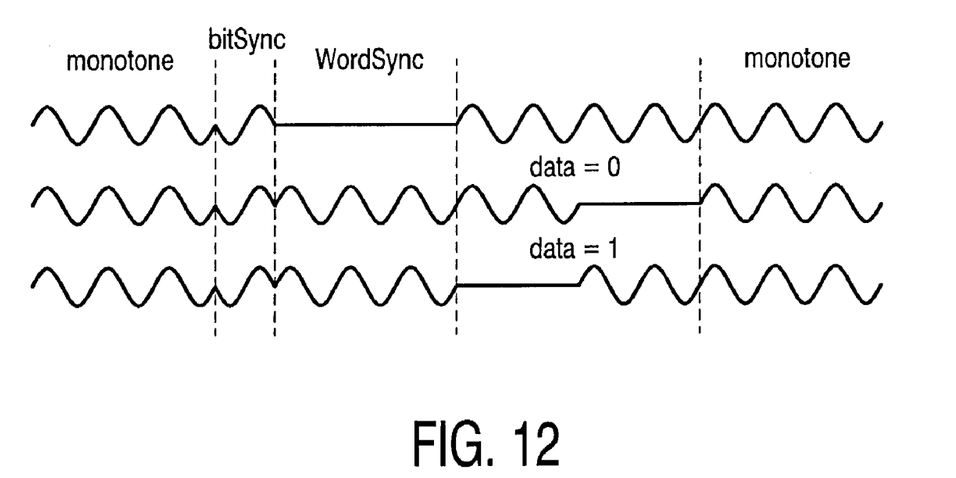
FIG. 12 shows servo track on/off modulation with bit sync.

FIG. 12 shows servo track on/off modulation with bit sync. The bit sync is encoded by an inverted wobble.

Although the invention has been explained by embodiments using a wobble modulation, any other suitable parameter of the track may be modulated, e.g., the track width. Also, for the record carrier, an optical disc has been described, but other media, such as a magnetic disc or tape, may be used. It is noted, that in this document, the word 'comprising' does not exclude the presence of other elements or steps than those listed, and the word 'a' or 'an' preceding an element does not exclude the presence of a plurality of such elements, that any reference signs do not limit the scope of the claims, that the invention may be implemented by means of both hardware and software, and that several 'means' may be represented by the same item of hardware. Further, the scope of the invention is not limited to the embodiments, and the invention lies in each and every novel feature or combination of features described above.

The invention claimed is:

1. A record carrier comprising a servo track indicating an information track intended for recording information blocks represented by marks having lengths expressed in channel bits, said servo track having a periodic variation of a physical parameter at a first frequency and modulated parts for encoding record carrier information, characterized in that the modulated parts comprise a second frequency, substantially different from the first frequency, for encoding data bits of the record carrier information, the second frequency being a integral multiple N of the first frequency.

2. The record carrier as claimed in claim 1, wherein in the case that M periods of said periodic variation correspond to one bit of the record carrier information, the second frequency being a multiple N of the first frequency divided by M.

3. The record carrier as claimed in claim 1, wherein the modulated parts comprise low frequency units directly representing digital bits, said low frequency being at least 4 times lower than the first frequency.

4. The record carrier as claimed in claim 1, wherein the modulated parts comprise a sync part and a data part, the sync part comprising at least one period of said periodic variation having a phase inverse to the phase of the non-modulated periodic variations.

5. The record carrier as claimed in claim 1, wherein the length of one periodic variation corresponds to a third predetermined number of channel bits.

6. A recording and/or playback device comprising means for writing and/or reading information blocks represented by marks having lengths expressed in channel bits in an information track on a servo track of a record carrier as claimed in claim 1, said device further comprising means for scanning the servo track and means for retrieving the record carrier information, characterized in that the retrieving means comprises demodulation means for retrieving data bits of the record carrier information from the modulated parts.

7. The recording and/or playback device as claimed in claim 6, wherein the device comprises synchronization means for synchronizing to a sync part included in the modulated parts, the sync part comprising at least one variation of a phase inverse to the phase of the not modulated periodic variations.

8. The recording and/or playback device as claimed in claim 6, wherein the device comprises recording positioning means for positioning an information block to be recorded based on the physical location of one of the periodic variations corresponding to an address of said information block by calculating said physical location from the length of one periodic variation corresponding to a third predetermined number of channel bits.

9. A method of manufacturing a record carrier, said method comprising the steps of:

providing the record carrier with a servo track indicating an information track intended for recording information blocks represented by marks having lengths expressed in channel bits;

varying a physical parameter of the servo track with a periodic variation at a first frequency; and modulating parts of the servo track for encoding record carrier information, characterized in that the modulated parts have a second frequency, substantially different from the first frequency, for encoding data bits of the record carrier information, the second frequency being a integral multiple N of the first frequency.

* * * * *